US012782131B2

(12) United States Patent
Mazzarella et al.

(10) Patent No.: US 12,782,131 B2
(45) Date of Patent: Nov. 3, 2026

(54) GYROSCOPE DRIVE LOOP WITH RESONANT AMPLITUDE SAMPLING AND PWM DRIVE

(71) Applicant: InvenSense, Inc., San Jose, CA (US)

(72) Inventors: Federico Mazzarella, Binasco (IT); Giacomo Petracca, Assago (IT); Luca Collamati, Jesi (IT); Andrea Di Ruzza, Locate di Triulzi (IT); Carlo Pinna, Milan (IT); Vadim Tsinker, Belmont, CA (US); Carlo Mattaliano, Casteltermini (IT)

(73) Assignee: InvenSense, Inc., San Jose, CA (US)

( * ) Notice: Subject to any disclaimer, the term of this patent is extended or adjusted under 35 U.S.C. 154(b) by 196 days.

(21) Appl. No.: 18/535,271

(22) Filed: Dec. 11, 2023

(65) Prior Publication Data

US 2025/0052573 A1 Feb. 13, 2025

Related U.S. Application Data

(60) Provisional application No. 63/531,489, filed on Aug. 8, 2023.

(51) Int. Cl.
*G01C 19/5776* (2012.01)

(52) U.S. Cl.
CPC ................................ *G01C 19/5776* (2013.01)

(58) Field of Classification Search
None
See application file for complete search history.

(56) References Cited

U.S. PATENT DOCUMENTS

| | | | | |
|---|---|---|---|---|
| 5,481,914 | A * | 1/1996 | Ward | H03F 1/083 73/504.16 |
| 6,718,823 | B2 | 4/2004 | Platt et al. | |
| 9,644,961 | B2 | 5/2017 | Aaltonen et al. | |
| 10,050,613 | B2 | 8/2018 | Dakshinamurthy | |
| 2012/0160027 | A1 * | 6/2012 | Hsu | B81C 1/00301 73/504.08 |
| 2016/0252544 | A1 * | 9/2016 | Malvern | G01P 15/13 73/514.32 |
| 2017/0328712 | A1 * | 11/2017 | Collin | H03M 3/458 |
| 2022/0412738 | A1 | 12/2022 | Donadel et al. | |

FOREIGN PATENT DOCUMENTS

WO 2009009803 A2 1/2009

* cited by examiner

*Primary Examiner* — Mark A Shabman
(74) *Attorney, Agent, or Firm* — Van Hoven PC; Joshua Van Hoven

(57) ABSTRACT

A MEMS gyroscope includes a mixed analog and digital drive loop. A drive sense signal from a suspended spring-mass system is received by the drive loop, rectified, and compared to a reference signal. The result of the comparison is processed and converted into a digital signal that is processed by a digital filter and a digital pulse-width modulator of the drive loop. The output of the pulse width modulator controls a high-voltage drive of the drive loop that generates a drive signal having an amplitude based on the pulse width modulator output signal and supplies the drive signal to drive the suspended spring-mass system.

16 Claims, 10 Drawing Sheets

GYROSCOPE DRIVE LOOP WITH RESONANT AMPLITUDE SAMPLING AND PWM DRIVE

BACKGROUND

Numerous devices such as smart phones, smart watches, tablets, automobiles, aerial drones, appliances, aircraft, exercise aids, and game controllers may utilize sensors such as microelectromechanical system (MEMS) sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

MEMS gyroscopes typically require that a drive force be applied to movable components of the suspended MEMS structure to initiate a drive motion of those components, such as via an electrostatic drive system. This drive motion is directly or indirectly imparted on proof masses which are able to move in a direction perpendicular to the direction of the drive motion in response to a Coriolis force generated by a rotation of the MEMS gyroscope about an axis perpendicular to the direction of the drive motion. Accordingly, the Coriolis force that is used to determine angular velocity is based on the drive motion and the drive motion is monitored and controlled to ensure a consistent drive amplitude and waveform (e.g., drive frequency and phase). This drive monitoring and control circuitry is primarily implemented with analog components that occupy a substantial amount of circuit area of a MEMS gyroscope.

SUMMARY

In an embodiment of the present disclosure, a microelectromechanical system (MEMS) gyroscope comprises a suspended spring-mass system comprising a driven mass and a drive system operably coupled to the driven mass via the suspended spring-mass system to impart a drive motion onto the driven mass based on a drive signal. The MEMS gyroscope may further comprise one or more drive sense electrodes located proximate to the driven mass to generate a drive sense signal based on the drive motion of the driven mass and processing circuitry. The processing circuitry may be configured to receive the drive sense signal, rectify the drive sense signal, subtract the rectified drive sense signal from a drive reference signal to generate an analog error signal, digitize the analog error signal to generate a digitized error signal, digitally filter the digitized error signal with a digital filter, generate a pulse-width-modulated drive control signal based on the digitally filtered digitized error signal, and generate the drive signal in proportion to the pulse-width-modulated drive control signal.

In an embodiment of the present disclosure, a MEMS gyroscope comprises a suspended spring-mass system comprising a driven mass and a drive system operably coupled to the driven mass via the suspended spring-mass system to impart a drive motion onto the driven mass based on a drive signal. The gyroscope may further comprise one or more drive sense electrodes located proximate to the driven mass to generate a drive sense signal based on the drive motion of the driven mass and processing circuitry. The processing circuitry may be configured to receive the drive sense signal, digitize the drive sense signal, digitally process the digitized drive sense signal with a high-pass filter, and utilize a zero-crossing detector and a programmable delay to generate a square wave drive signal with a programmable phase with respect to the drive sense signal.

In an embodiment of the present disclosure, a method for driving a MEMS gyroscope comprises generating, by one or more drive sense electrodes located proximate to a driven mass of a suspended spring-mass system, a drive sense signal based on a drive motion of the driven mass. The method may further comprise rectifying the drive sense signal, subtracting the rectified drive sense signal from a drive reference signal to generate an analog error signal, and digitizing the analog error signal to generate a digitized error signal. The method may further comprise digitally filtering the digitized error signal, generating a pulse-width-modulated drive control signal based on the digitally filtered digitized error signal, generating a drive signal in proportion to the pulse-width-modulated drive control signal, and imparting, by a drive system operably coupled to the driven mass via the suspended spring-mass system, a drive motion onto the driven mass based on the drive signal.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Figure 1:
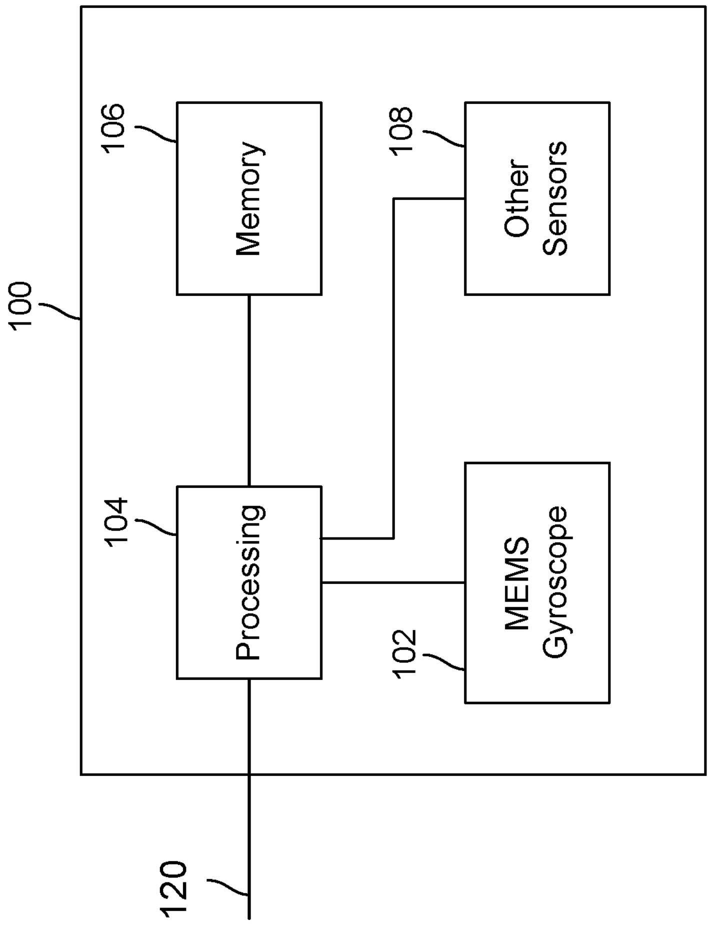
FIG. 1 shows an illustrative MEMS system in accordance with an embodiment of the present disclosure.

MEMS gyroscopes typically operate based on sensing of a Coriolis force. A portion of the MEMS gyroscope may be fabricated to include a number of interconnected components within a MEMS layer, such as springs, masses, anchoring points, and lever arms, which may collectively be referred to as a suspended spring-mass system. Components of the suspended spring-mass system are caused to oscillate in a linear motion along an axis or in a rotational motion about an axis, or in some implementations, a combination thereof. The oscillation is caused by a drive force which is imparted on directly driven components (e.g., a drive mass) such as by electrostatic forces imparted by an actuator (e.g., a drive electrode) located adjacent to the directly driven component. The drive of the directly driven component typically causes the motion of a variety of other components of the suspended spring-mass system, such as a proof mass that is used to sense the Coriolis force. The proof mass may be connected within the suspended spring-mass system such that it is capable of moving in response to the Coriolis force, which in turn is generated based on an angular velocity about an axis perpendicular to the drive axis, based on the drive motion. Accordingly, sensing of the force of interest (e.g., angular velocity) is dependent upon the characteristics of the drive motion, such as drive amplitude, drive velocity, and drive frequency.

The movement of a driven mass (e.g., a directly driven drive mass and/or an indirectly driven proof mass) may be sensed such as by using electrostatic sensing with a drive sense electrode located adjacent to the driven mass along the drive direction. A capacitance between the driven mass and a fixed drive sense electrode changes based on the changing distance between the driven mass and the drive sense electrode due to the drive motion. The drive amplitude and/or frequency of the driven mass can be monitored in a drive loop in order to dynamically adjust the drive signal that imparts the drive force onto the suspended spring-mass system, such that a desired drive motion is provided. This gyroscope drive regulation loop typically requires several analog components operating at low frequency, including one or two high-pass filters and a low frequency proportional-integral loop filter. Moreover, because the actuator needs to drive a relatively high voltage on the drive electrodes, a high voltage linear amplifier is typically used to control the amplitude of the drive harmonic imposed at the electrodes. Both of these features (low frequency filters and high voltage linear amplifier) occupy a large area in analog processing of the drive sense signal. In some instances, MEMS gyroscopes have attempted to overcome these large area consumption issues by performing some of these operations with digital processing. However, a significant drawback of existing digital implementations is that they require a relatively sophisticated analog-to-digital converter, such that the entirety of the drive sense capacitance-to-voltage (DC2V) output waveform is digitized at high frequency.

In accordance with the present disclosure, an analog processing stage preprocesses the drive sense signal for monitoring and control by a digital processing stage. This analog processing performs a number of processing steps on a received drive sense signal to generate a digital error signal, including rectifying the drive signal, demodulating the drive signal to baseband from the drive frequency, and subtracting a reference signal from the rectified and demodulated signal. The reference signal corresponds to a desired amplitude of the drive sense signal such that the remaining signal corresponds to the drive sense amplitude error. This drive sense error is integrated over a drive cycle and only this integrated drive sense error is digitized and only once a drive cycle. This allows a simple analog-to-digital converter (ADC) such as a successive approximation register (SAR) ADC to be utilized for digitizing the drive amplitude error for further digital analysis and processing. This results in simplification of the ADC design and optimizes the power consumption of the system. Furthermore, the same SAR ADC can be shared with the Coriolis sense path, further optimizing area occupation.

The processing of the drive amplitude error is performed in the digital domain, resulting in significant area savings compared to a primarily analog control loop. Drive signal amplitude control is performed with a pulse width modulator (PWM), allowing the typical high voltage linear amplifier to be removed from this design. The duty cycle of the PWM is modified in accordance with the received drive amplitude error signal to drive that error towards zero. Prior to modifying the PWM output, the drive amplitude error signal is filtered digitally and a predistortion is applied to maintain linearity. The output of the PWM is provided to a digital decoder which in turn directly controls drive signal generation by a high voltage drive, eliminating the need for an additional digital-to-analog converter.

In addition to the digital drive control loop utilized during normal operation, the start-up sequence for the MEMS gyroscope drive may be performed digitally, for example, until an initial drive amplitude is achieved. While the MEMS gyroscope is initially at rest, forces such as stiction and the initial inertia of the suspended spring-mass system must be overcome to initialize the drive motion. An open-loop digital burst sequence may initially be applied to overcome these initial forces, for example, for a predetermined time period. The drive signal may then be monitored directly (e.g., without analog generation of an error signal) as a digital start-up sequence is performed. The digital start-up sequence monitors the drive sense signal characteristics such as amplitude and phase and applies a predetermined phase shift to the signal until a criteria for the drive sense signal such as a predetermined amplitude threshold is met, after which processing may be switched to the drive control loop analog and digital path for ongoing sensor operation.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In accordance with the present disclosure, the MEMS system may include a MEMS gyroscope 102 as well as additional sensors 108.

Processing circuitry 104 may include one or more components providing processing based on the requirements of the MEMS system 100. In some embodiments, processing circuitry 104 may include hardware control logic that may be integrated within a chip of a sensor (e.g., on a base substrate of a MEMS gyroscope 102 or other sensors 108, or on an adjacent portion of a chip to the MEMS gyroscope 102 or other sensors 108) to control the operation of the MEMS gyroscope 102 or other sensors 108 and perform aspects of processing for the MEMS gyroscope 102 or the other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS gyroscope 102 by interacting with the hardware control logic and processing signals received from MEMS gyroscope 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment the processing circuitry 104 may process data received from the MEMS gyroscope 102 and other sensors 108 and communicate with external components via a communication interface 110 (e.g., a serial peripheral interface (SPI) or I2C bus, in automotive applications a controller area network (CAN) or Local Interconnect Network (LIN) bus, or in other applications a suitable wired or wireless communications interface as is known in the art). The processing circuitry 104 may convert signals received from the MEMS gyroscope 102 and other sensors 108 into appropriate measurement units (e.g., based on settings provided by other computing units communicating over the communication interface 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other sensors 108.

In some embodiments, certain types of information may be determined based on data from multiple MEMS gyroscopes 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

In embodiments of the present disclosure, a gyroscope drive sensing and control system is implemented as a drive loop with mixed analog and digital processing. During an initial start-up phase of operation, a signal such as an initial digital burst signal is provided to control a high-voltage drive (e.g., via a digital high-voltage drive decoder) that in turn applies a force such as an electrostatic force to one or more components of the MEMS gyroscope (e.g., by applying an electrostatic force to one or more drive masses of a suspended spring-mass system via one or more drive electrodes) to initiate the drive motion on the MEMS gyroscope, for example, to overcome any initial stiction associated with the suspended spring-mass system of the MEMS gyroscope while at rest. Once the drive motion is initiated, the drive motion of one or more components (e.g., a driven mass such as the drive mass or a proof mass driven by the drive mass) is sensed and the MEMS gyroscope switches from the initial (e.g., burst) portion of the start-up phase to a start-up portion of the start-up phase in which the sensed signal is monitored (e.g., the amplitude and/or phase of the drive sense signal) until the drive sense output is suitable to allow the operational drive loop to begin.

During this operational drive loop both analog processing circuitry and digital processing circuitry are utilized to monitor and control the drive loop. The drive sense signal is initially processed by the analog processing circuitry, for example, by rectifying the drive sense signal, demodulating the drive sense signal, subtracting a reference signal from the rectified and demodulated drive sense signal, and integrating the result of the subtraction to generate an analog error signal. The analog error signal is digitized and is provided to a digital filter (e.g., a proportional-integral or PI filter) which attempts to minimize the digital representation of the integration output, which in turn corresponds to driving the rectified and demodulated drive sense output to match the reference signal. The digital filter may also include additional filtering operations such as applying a sinc function to the digital digitized analog error signal prior to the PI control function. The digital filter may also include a low-pass filter that is applied to the output of the PI control function. Digital control of the high voltage drive is provided such as via a pulse-width modulator that adjusts its duty cycle in accordance with the amplitude of the drive signal to be output by the high voltage drive. In order to linearize a transfer function of the pulse width modulator, a pre-distortion function may be applied to the output of the digital filter.

Figure 2A:
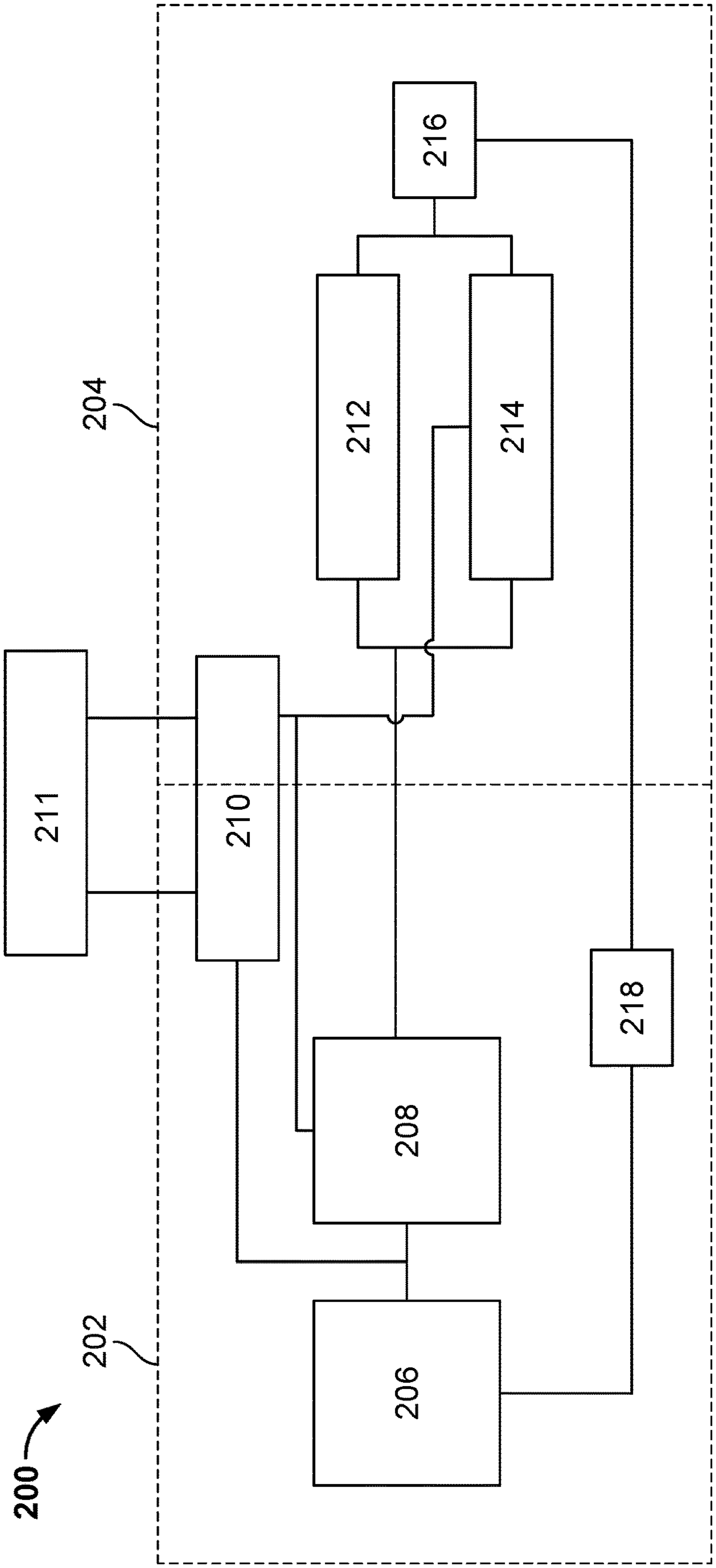
FIG. 2A depicts a block diagram of an exemplary gyroscope drive loop in accordance with an embodiment of the present disclosure.

FIG. 2A depicts a block diagram of an exemplary gyroscope drive loop in accordance with an embodiment of the present disclosure. Although FIG. 2A will be described in the context of MEMS gyroscope device and system components, it will be understood that the present disclosure may be utilized with a variety of MEMS applications in which a relatively high power drive signal must be applied with high precision at a frequency. Although particular components are depicted and described in FIG. 2A, it will be understood that components may be added, removed, substituted, or modified in accordance with the present disclosure. For example, in some embodiments an initial drive signal may be provided by the digital drive loop itself (e.g., digital drive loop control 214, without digital start-up control 212), timing and phase control may be generated from a received signal other than the drive sense signal (e.g., from a phase shifted Coriolis or quadrature sense signal), or different methods of generating a suitable analog drive signal from a digital drive control signal may be utilized. As an example of initial drive loop control, a drive signal may be provided in an open loop by providing a burst signal having the same resonance frequency as the MEMS gyroscope. In the example depicted in FIG. 2A, a MEMS gyroscope drive loop includes, wholly or partially within an analog stage 202, MEMS components and circuitry 206, analog drive loop circuitry 208, internal timing circuitry 210, and drive circuitry 218. The MEMS gyroscope drive loop also includes, wholly or partially within a digital stage 204, internal timing circuitry 210, digital start-up drive control 212, digital drive loop control 214, and digital drive controller 216. External timing circuitry 211 is connected to internal timing circuitry 210.

Relevant to the present drive loop discussion, MEMS components and circuitry 206 outputs a drive sense signal that is based on measuring a physical drive motion applied to one or more components of a MEMS device such as a drive mass or proof mass of a MEMS gyroscope, based on a drive signal provided to the MEMS components and circuitry 206 from drive circuitry 218. The exemplary embodiments depicted herein are directed to drive monitoring and control, and thus do not depict other sensing and control paths of the MEMS device such as a Coriolis sense path from MEMS components and circuitry 206, although various components such as C2V amplifiers, multiplexers, demultiplexers, and analog-to-digital converters (ADCs)

may be shared between such other circuitry and the drive loop circuitry depicted and described herein.

The drive sense signal output from MEMS components and circuitry 206 is output to analog drive loop circuitry 208 and to internal timing circuitry. Internal timing circuitry 210 monitors the phase of the drive sense signal and, in conjunction with external timing circuitry 211, generates and distributes various timing signals for components of the gyroscope drive control loop, for example, to use in performing demodulation, phase alignment, phase shifting, and the like. Analog drive loop circuitry 208 provides for analog processing of the drive sense signal such as signal multiplexing (e.g., for selectively routing different differently modified drive sense signals to an analog-to-digital converter for routing to digital start-up drive control 212 or digital drive loop control 214), rectification, demodulation, reference signal comparison, integration, and analog-to-digital conversion. The output (e.g., a digital output signal) of analog drive loop circuitry is provided to both digital start-up drive control 212 and digital drive loop control 214, although only one of digital start-up drive control 212 or digital drive loop control 214 may process processing the output signal at a time in an exemplary implementation.

Digital start-up drive control 212 is utilized when the MEMS gyroscope is initially at rest and/or is operating at an amplitude and/or phase which does not meet certain criteria. For example, at an initial start-up of the MEMS gyroscope (e.g., of MEMS components and circuitry 206) an initial burst drive may be provided (e.g., for a predetermined time period) to overcome stiction and other initial forces and begin the oscillation of the drive masses and other driven components of a suspended spring-mass system of the MEMS gyroscope. Once the drive oscillation has been initiated, the digital start-up drive control may transition to a start-up operational stage in which an initial drive waveform (e.g., a 50% duty cycle waveform) is provided until certain criteria are met (e.g., until a certain drive sense amplitude is achieved at an appropriate phase). Once the start-up criteria is achieved, the gyroscope drive loop switches to operational drive loop operation, for example, by modifying a signal processing path within the analog drive loop circuitry 208 to prepare the drive sense signal for processing by digital drive loop control 214.

As an example, during the operational drive loop operation the drive sense signal may be rectified and demodulated (e.g., from the drive frequency to baseband) and modified by a reference signal. The reference signal may be a controllable current that is selected such that if the drive sense signal has the proper amplitude the result of the modification of the rectified and demodulated drive sense signal by the reference signal is essentially a zero output provided to the next analog processing stage, which is an integrator that averages the difference between the rectified and demodulated drive sense signal as compared to the reference signal over a predetermined period of time. The integrated difference is provided to an ADC converter to prepare the signal for processing by the digital drive loop control, which generates an output control signal that is provided to the digital drive controller 216 to control the amplitude and phase/frequency of the drive signal output from drive circuitry 218 to components such as drive electrodes of the MEMS components and circuitry 206 (e.g., a pulse width modulated (PWM) control signal for selectively modifying the drive signal in accordance with PWM duty cycle).

Figure 2B:
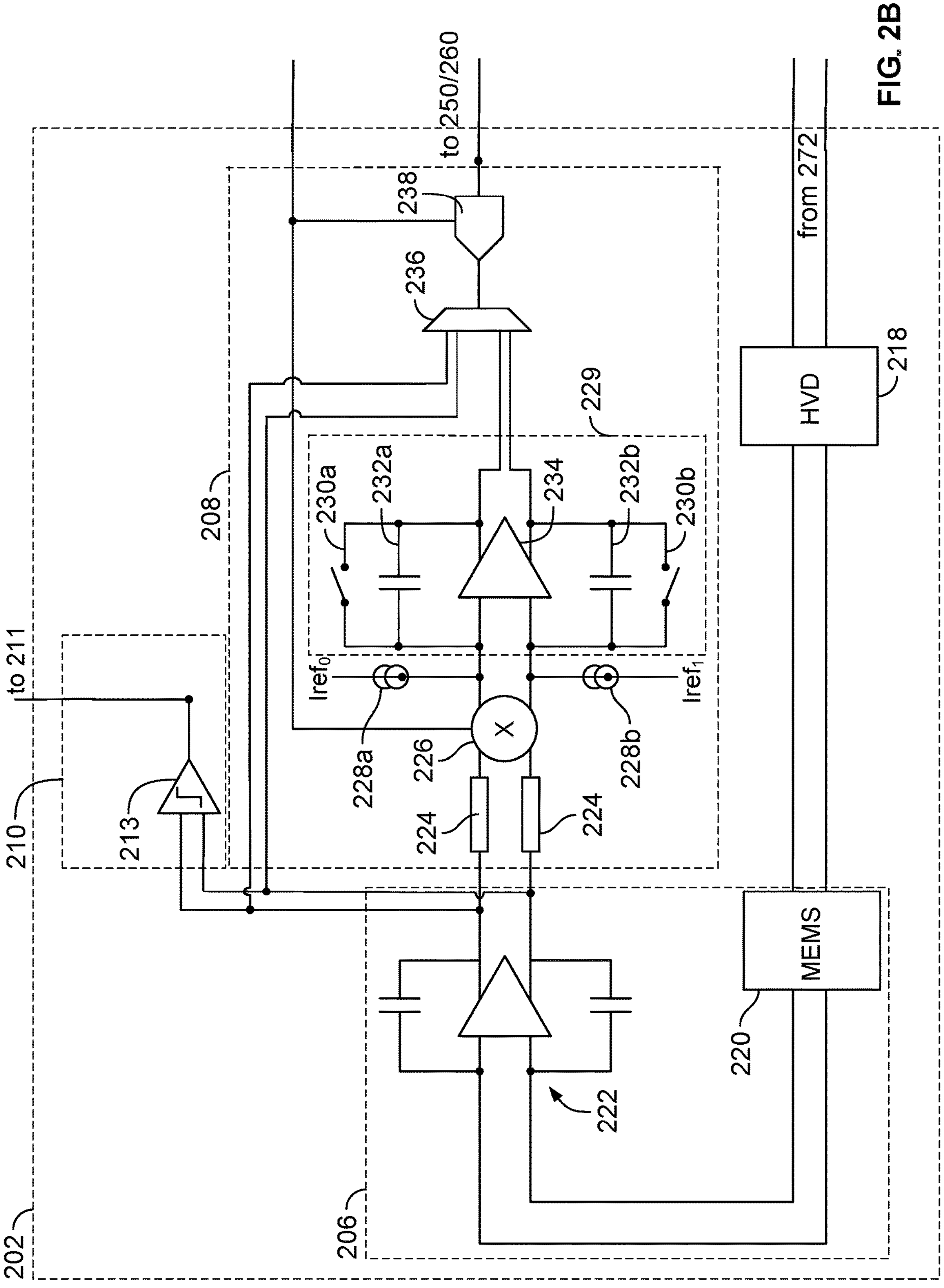
FIG. 2B depicts a circuit diagram of an analog portion of the exemplary gyroscope drive loop of FIG. 2A in accordance with an embodiment of the present disclosure.

FIG. 2B depicts a circuit diagram of an analog portion of the exemplary gyroscope drive loop of FIG. 2A in accordance with an embodiment of the present disclosure. Although particular components are depicted and described in FIG. 2B, it will be understood that components may be added, removed, substituted, or modified in accordance with the present disclosure. For example, in some embodiments the C2V drive output may be sampled digitally and the error signal generated in the digital domain, including providing a digitized reference signal for digital error signal generation. In the example of FIG. 2B, the analog portion of the exemplary drive loop of FIG. 2A is an analog stage 202 including MEMS components and circuitry 206, analog drive loop circuitry 208, internal timing circuitry 210, and drive circuitry 218. MEMS components and circuitry 206 is depicted in FIG. 2B as including a suspended spring-mass system 220 that outputs, inter alia, a drive sense signal to a C2V amplifier 222. An analog portion of internal timing circuit 210 includes a comparator 213 coupled to the drive sense output from C2V amplifier 222. Analog drive loop circuitry 208 is depicted in FIG. 2A as including rectifier 224 that is coupled to drive sense output from C2V amplifier 222, mixer/demodulator 226, reference signals 228, an integrator 229 (e.g., that includes amplifier 234, switches 230*a* and 230*b*, and capacitors 232*a* and 232*b*), multiplexer 236, and an analog-to-digital converter 238.

An analog portion of internal timing circuit 210 includes a comparator 213 coupled to the drive sense output from C2V amplifier 222. The oscillation phase of the drive motion is derived by comparator 213 that changes its state based on a comparison of the drive sense output from C2V amplifier to a threshold, which may be selected based on a desired signal level to trigger changes in the comparator 213 output. Although not depicted in FIGS. 2A-2C, the threshold may be provided by processing circuitry to generate a desired duty cycle at the comparator 213 output. The comparator 213 output functions as a reference clock and is provided to external timing circuitry 213 such as a phase locked loop (PLL), which generates a clock signal synchronous with the mechanical oscillation to facilitate timing control (e.g., by digital timing control 240 of the digital portion of timing circuit 210) that is distributed for functions such as demodulation (e.g., at demodulator/mixer 226), ADC timing (e.g., at SAR ADC 238), and drive actuation (e.g., at PWM 268).

Analog drive loop circuitry 208 is depicted in FIG. 2A as including a rectifier 224 that is coupled to the drive sense output from C2V amplifier 222. The C2V amplifier 222 output is the drive sense signal which is a periodic signal that oscillates about zero at the drive frequency. Rectifier 224 rectifies the drive sense signal such that the entirety of the oscillation amplitude has a positive sign for further processing. The rectified drive sense signal is output from rectifier 224 to mixer/demodulator 226, which demodulates the rectified drive sense signal to baseband based on the timing signal (e.g., provided from digital timing control 240 to mixer/demodulator 226) matching the frequency and phase of the drive sense signal.

The rectified and demodulated drive sense signal is representative of the baseband amplitude of the drive motion. This signal is then compared to a value representative of a target drive motion for the system. Generally, this will be a fixed value based on the system design, although the target drive motion may be modified, for example, based on a desired power consumption or differing requirements for precision/accuracy at different times (e.g., noise or temperature compensation). In some embodiments, the value representative of the target drive motion may be implemented by reference signals 228, which may be reference current sources $I_{ref0}$ and $I_{ref1}$, which are selected such that when the output of demodulator 226 corresponds to the target drive motion, the inputs of the amplifier 234 of the integrator 229 (e.g., as implemented by amplifier 234, switches 230*a* and 230*b*, and capacitors 232*a* and 232*b*) will see approximately zero current resulting in a zero output voltage from amplifier 234, while differences between the target drive motion and the drive motion represented by the rectified and demodulated drive sense signal will be represented at the output of amplifier 234 as a positive or negative voltage.

Although integrator 229 may be implemented in a variety of manners, in the embodiment of FIG. 2B integrator 229 includes amplifier 234, switches 230*a* and 230*b*, and capacitors 232*a* and 232*b*. Switches 230*a* and 230*b* selectively short between the input and output nodes of amplifier 234 to reset the amplifier 234 (e.g., at each drive cycle). Accordingly, the drive sense error value signal from amplifier 234 of integrator 229 is reset between each drive cycle (or at another predetermined interval), allowing use of a relatively slow ADC 238 such as a SAR ADC. By utilizing the integrated drive sense error, the ADC 238 will consume less current than a higher speed ADC. The same ADC 238 can also be shared with the Coriolis sense path (not depicted), further optimizing area occupation.

In some embodiments as depicted in FIG. 2B, the drive sense error signal output of integrator 229 is only provided to the ADC 238 during normal operation in which the drive signal provided to the MEMS 220 is being dynamically modified to maintain a desired drive amplitude. During other stages of operation such as device start-up the drive system must overcome the initial inertia of the suspended spring mass system and ramp up towards the drive amplitude. During this start-up stage, the drive signal may be directly monitored (or in some embodiments, monitored with minimal analog processing) until the drive sense amplitude exceeds a criteria such as achieving a threshold amplitude for a predetermined period of time. Accordingly, a signal path is provided directly from the output of C2V amplifier 222 to the input of multiplexer 236, bypassing the analog error determination signal path. Accordingly, multiplexer 236 selectively provides either the drive sense signal or the drive sense error signal to ADC 238 and for further processing by the digital stage 204.

Figure 2C:
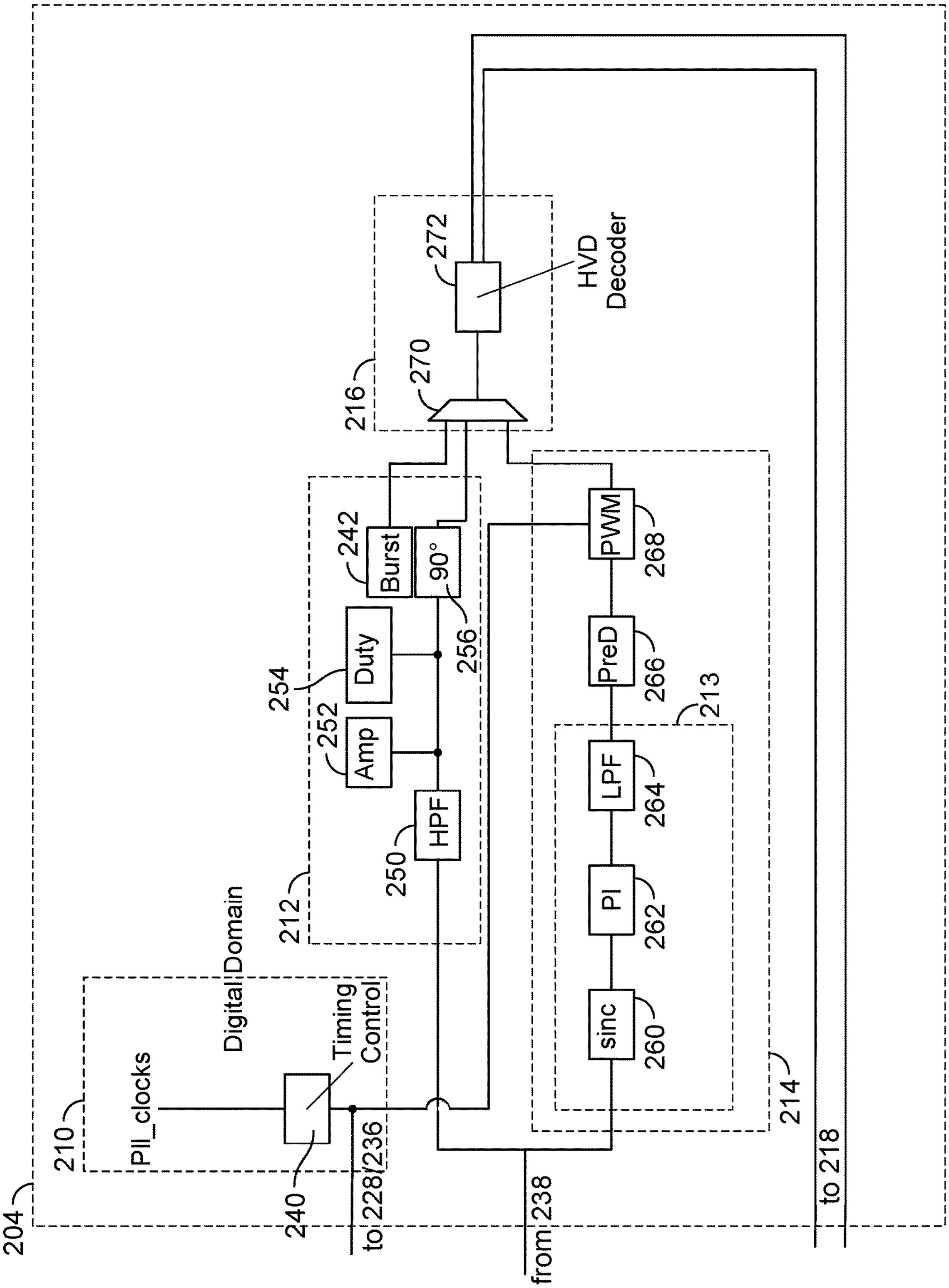
FIG. 2C depicts a circuit diagram of a digital portion of the exemplary gyroscope drive loop of FIG. 2A in accordance with an embodiment of the present disclosure.

In the embodiment of FIGS. 2B and 2C, high voltage drive 218 is driven directly by a pulse width modulated digital control signal provided at the drive frequency and outputs a high voltage drive signal to the MEMS system 220 (e.g., to drive electrodes of the MEMS system 220) to impart the drive motion on the suspended spring-mass system. For example, digital HVD decoder 272 outputs a digital control signal having a duty cycle, phase, and frequency based on a control signal provided either by digital start-up control 212 or digital drive loop control 214.

FIG. 2C depicts a circuit diagram of a digital portion of the exemplary gyroscope drive loop of FIG. 2A in accordance with an embodiment of the present disclosure. Although particular components are depicted and described in FIG. 2C, it will be understood that components may be added, removed, substituted, or modified in accordance with the present disclosure. In the example of FIG. 2C, the digital portion of the exemplary drive loop of FIG. 2A is a digital stage 204 including a digital portion of internal timing circuitry 210, digital start-up drive control 212, digital drive loop control 214, and digital drive controller 216. Internal timing circuitry 210 is depicted in FIG. 2C as including digital timing control 240 that generates control signals (e.g., with a particular phase and frequency) for distribution to components of the gyroscope drive loop. Digital start-up drive control 212 is depicted in FIG. 2C as including two separate signal paths including a burst path including burst control 242 and a start-up path including a high-pass filter 250, amplitude detector 252, phase detector 254, and phase shift 256. Digital drive loop control 214 is depicted in FIG. 2C as including a digital filter 213 (e.g., including a sinc function 260, proportional-integral filter 262, and a low-pass filter 264), predistortion control 266, and pulse width modulator 268. The outputs of each of the burst, start-up signal, and drive loop paths are provided to digital drive controller 216, which includes multiplexer 270 such that one of these signals is selectively provided to the digital drive controller (e.g., high-voltage drive or HVD decoder 272).

Internal timing circuitry 210 is depicted in FIG. 2C as including digital timing control 240, which generates respective timing control signals (e.g., with a particular phase and frequency) for distribution to analog and digital components of the gyroscope drive loop. In the embodiment depicted in FIGS. 2B-2C, digital timing control distributes a common timing signal to each of demodulator 226, integrator 229 (e.g., to switches 230*a* and 230*b*), ADC 238, and PWM 268, such that each of these components performs operations based on an identical reference frequency and phase. In other embodiments, different timing signals may be provided to different components, for example, to synchronize operations based on known signal propagation delays. The frequency of the timing signal(s) corresponds to the drive frequency, while the phase is coordinated with the phase of the actual physical movement of the driven mass or is at a predetermined phase delay with respect to the driven mass (e.g., 90 degrees).

Digital start-up drive control 212 is depicted in FIG. 2C as including two separate signal paths including a burst path including burst control 242 and a start-up path including a high-pass filter 250, amplitude detector 252, phase detector 254, and phase shift 256. The first step in the start-up sequence is for burst control 242 to generate an initial digital signal that is initiates a motion that overcomes the initial MEMS system inertia to initiate oscillation within the systems. Accordingly, multiplexer 270 outputs the signal from burst control 242 to HVD decoder 272 to control the drive signal. As an example, during initial start-up burst control 242 may output an open loop burst at approximately the resonance frequency for the MEMS system. This may be continued for a predetermined time associated with the MEMS system, or in some embodiments, may be continued until a criteria is met, such as the internal timing circuitry 210 accurately capturing the drive sense phase and frequency.

Digital start-up drive control 212 also includes the start-up drive path, which includes high-pass filter 250, amplitude detector 252, phase detector 254, and phase shift 256. In the embodiment depicted in FIGS. 2A and 2B, after the initial burst operation is complete, the drive sense signal from C2V amplifier 222 is provided directly to high-pass filter 250 via multiplexer 236 and ADC 238. In this manner, the start-up drive control is able to directly monitor the digitized drive sense signal, which may be sampled and digitized at an appropriate rate such as four times per drive period. Performing the start-up control processing (e.g., filtering, monitoring, phase shift, etc.) in the digital domain enables substantial area savings in the MEMS gyroscope package. High-pass filter 250 allows the drive signal at the drive frequency to be digitally processed while removing lower frequency signal components such as the drive sense offset. After the digital drive sense signal is high-pass filtered, amplitude detector 252 and phase detector 254 monitor the amplitude and phase of the drive sense, with the phase detector 254 monitoring zero crossings to ensure that the drive oscillation is occurring properly (e.g., an approximately 50% duty cycle on the drive sense) and the amplitude detector 252 monitoring the drive amplitude compared to one or more thresholds (e.g., meeting a threshold amplitude for a period of time) and ensuring that the drive amplitude does not exceed a maximum value. The high-pass filtered drive sense signal is then shifted 90 degrees in the digital domain by phase shift 256 to synchronize the drive mode with the drive sense mode, and provided as a drive signal to high voltage drive 218 via multiplexer 270 and HVD decoder 272. Once it is determined that the criteria for the start-up mode have been met (e.g., based on monitoring by amplitude detect 252 and phase detect 254), the multiplexers 236 and 270 may switch to the operational processing path in which the drive error is determined and the drive signal is modified to minimize the drive error, as described herein.

Digital drive loop control 214 is depicted in FIG. 2C as including a digital filter 213 (e.g., including a sinc function 260, proportional-integral filter 262, and a low-pass filter 264), predistortion control 266, and pulse width modulator 268. During the operational mode, the digital drive sense error signal is generated by the analog stage 202 and is received from ADC 238 at sinc function 260 of digital filter 213. The sinc function 260 removes any offset contribution from the drive error signal that may have been added by the integrator 229 and/or ADC 238, while the proportional-integral filter 262 and low-pass filter reduce noise that are added to the drive error signal by the by the integrator 229 and/or ADC 238. The proportional-integral filter also attempts to minimize the digital representation of the integration output, which in turn corresponds to driving the rectified and demodulated drive sense output to match the reference signal. Predistortion control 266 is included to counteract non-linearities that are added by the pulse width modulator 268. Predistortion control linearizes the overall transfer function of the digital drive loop control 214 to improve the stability of the drive loop. Pulse width modulator 268 outputs a drive control signal at the drive frequency and having an appropriate phase (e.g., based on a received timing control signal), with amplitude control based on a duty cycle that is proportional to a desired drive force to be imparted by high voltage drive 218. The drive signal is then provided to high voltage drive 218 via multiplexer 270 and HVD decoder 272. Utilizing pulse width modulation rather than amplitude modulation is simpler to implement than typical amplitude modulation techniques and the drive components function as a switch that can be more easily designed than a linear amplifier. Moreover, the efficiency of the drive is only limited by the switch resistance, such that the overall power consumption can be reduced. Accordingly, the digital control of high-voltage drive 218 lends itself naturally to PWM modulation (a kind of time to voltage conversion) and does not require an additional digital-to-analog conversion, allowing further area and power savings.

Figure 3A:
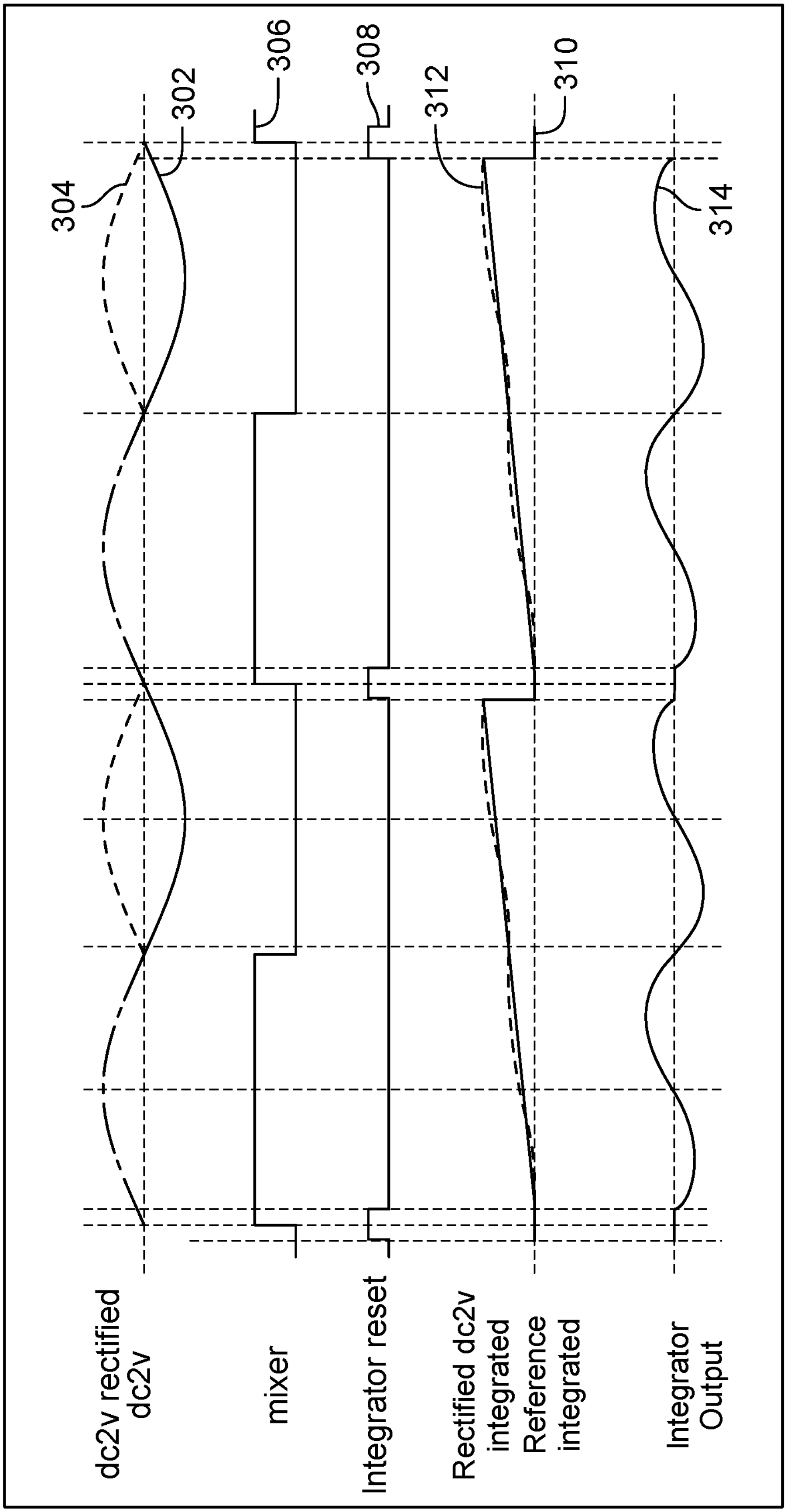
FIG. 3A depicts exemplary signal traces of an exemplary gyroscope drive loop along a common time scale in accordance with an embodiment of the present disclosure.
Figure 3B:
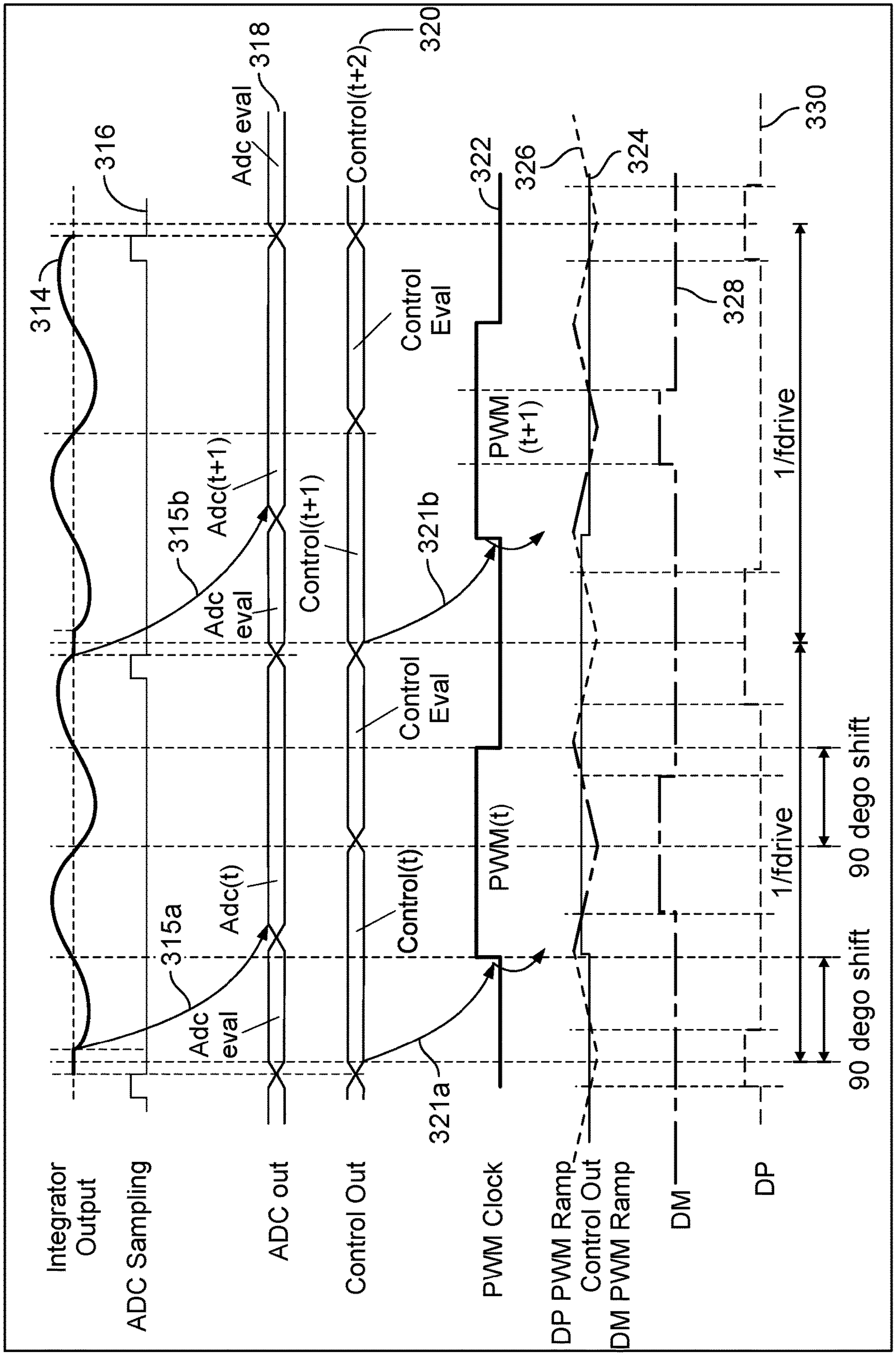
FIG. 3B depicts additional exemplary signal traces of an exemplary gyroscope drive loop along the common time scale of FIG. 3A in accordance with an embodiment of the present disclosure.

FIG. 3A depicts exemplary signal traces of an exemplary gyroscope drive loop along a common time scale in accordance with an embodiment of the present disclosure, while FIG. 3B depicts additional exemplary signal traces of an exemplary gyroscope drive loop along the common time scale of FIG. 3A in accordance with an embodiment of the present disclosure. To assist in comparing the signals of FIGS. 3A and 3B, integrator output 314 is included in both figures, i.e., as the lower-most signal of FIG. 3A and the upper-most signal of FIG. 3B. Although particular signals are depicted with specific timing and sign conventions in FIGS. 3A and 3B, it will be understood that modifications may be made to the specific processing operations, signal and processing timing, and signal comparisons depicted in FIGS. 3A and 3B.

As is depicted in FIG. 3A, a DC2V signal 302 corresponds to a drive sense output (e.g., from C2V amplifier 222), which is a sinusoid at the drive frequency in accordance with the sinusoidal drive motion imparted by the high voltage drive 218 driving components of the suspended spring mass system of the MEMS 220. The DC2V rectified signal 304 corresponds to the output of rectifier 224, rectifying the negative-signed portions of the DC2V signal 302. Mixer signal 306 corresponds to the timing control for the mixer/demodulator 226, which has a phase and frequency that are matched to the drive sense phase and frequency (e.g., based on the operation of comparator 213). Integrator reset signal 308 corresponds to the periodic reset of integrator 229 (e.g., by shorting switches 230*a* and 230*b*).

As is depicted by integrated reference signal 310, the reference signal is a constant current that would integrate as a linear ramp. The integrated DC2V signal 312 integrates as a ramp with an oscillation corresponding to the slope of the DC2V rectified signal 304. When the integrated reference signal 310 is subtracted from the integrated DC2V (e.g., by integrator 229), the resulting amplitude of the integrator output signal 314 corresponds to the drive sense error.

Continuing to FIG. 3B, ADC sampling signal 316 corresponds to a reset of the ADC 238 sampling of the integrator 229 output, with an ADC evaluation phase Adc Eval (e.g., a time period for evaluation by the ADC following sampling) following the reset and a sampling of Adc(t) as depicted by ADC out signal 318, with the sampling stage Adc(t) output corresponding to the received integrator output signal 314 delayed by 90 degrees, as depicted by 315*a* and 315*b*. Control out signal 320 corresponds to the digital output of pulse width modulator 268, with Control(t) corresponding to a PWM control signal at a first time and Control Eval corresponding to an evaluation period for generation of the control signal. The control out signal 320 is 90 degrees out of phase with the PWM Clock 322, such that a control signal control(t) is implemented at time PWM(t). The internal operation of HVD decoder 272 is depicted by Control Out signal 324 and PWM ramp signal 326. PWM Ramp signal 326 has "positive" portions DP PWM Ramp associated with positive portions of PWM Clock signal 322 and "negative" portions DP PWM Ramp associated with positive portions of PWM Clock signal 322. The resulting differential PWM drive signal (e.g., output from HVD decoder 272 to HVD 218) is depicted as signals DM 328 and DP 330. As can be seen in FIG. 3B, each of these differential signals has a duty cycle based on the PWM Ramp signal 326 and Control Out signal 324. For example, signal DP 330 is asserted when, during an unasserted portion of PWM Clock 322, the PWM Ramp signal 326 is lower than the Control Out signal 324. Similarly, signal DM 328 is asserted when, during an asserted portion of PWM Clock 322, the PWM Ramp signal 326 is lower than the Control Out signal 324. These pulse width modulated digital outputs in turn control the phase, frequency, and amplitude of the drive signal output by HVD 218.

FIGS. 4-7 depict steps of operation of an exemplary gyroscope drive loop with analog processing and digital control in accordance with some embodiments of the present disclosure. Although particular steps are depicted in a certain order for each of FIGS. 4-7, steps may be removed, modified, or substituted, and additional steps may be added in certain embodiments, and in some embodiments, the order of certain steps may be modified.

Figure 4:
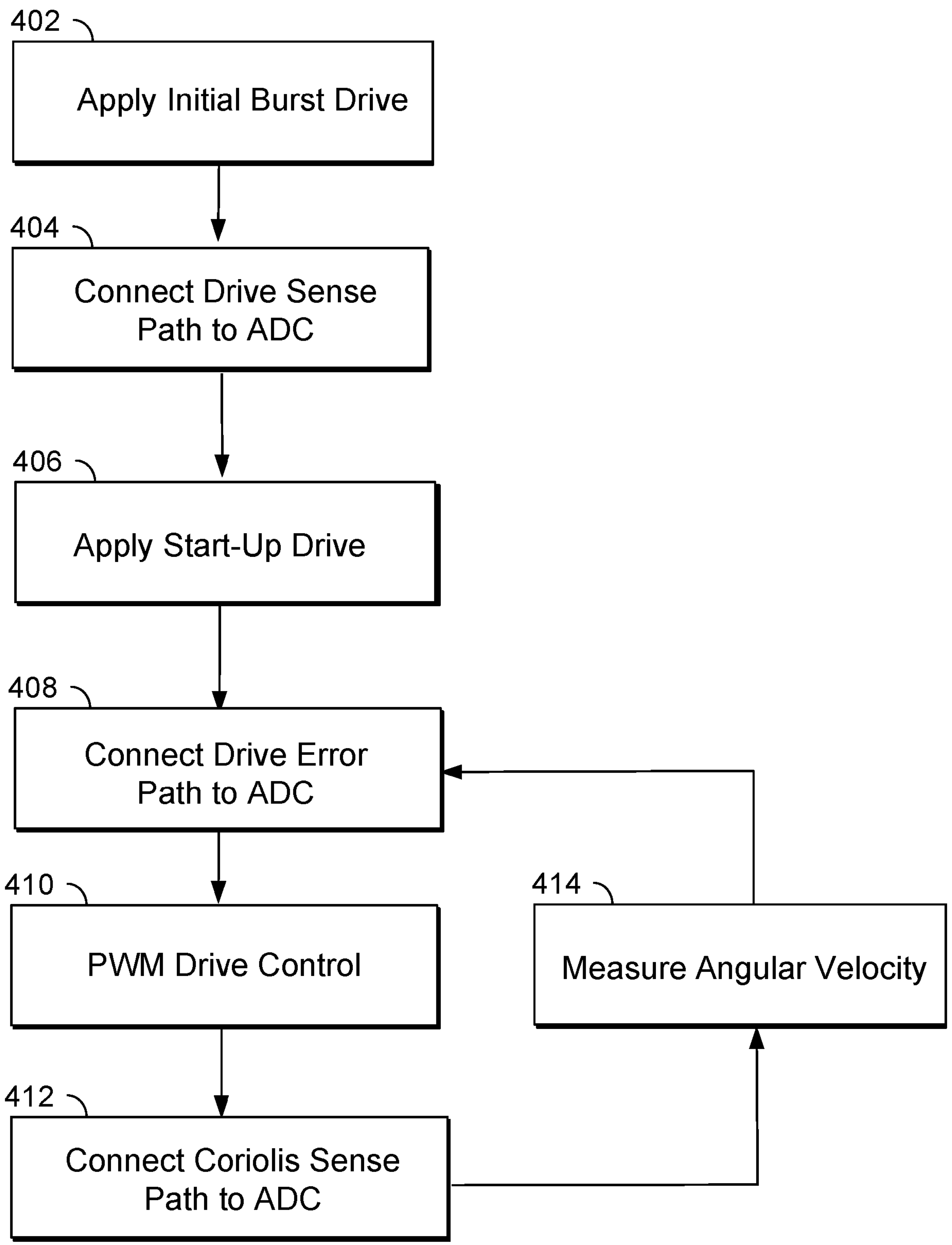
FIG. 4 depicts exemplary steps of a gyroscope drive signal drive loop in accordance with an embodiment of the present disclosure.

FIG. 4 depicts exemplary steps of a gyroscope drive signal drive loop in accordance with an embodiment of the present disclosure. FIG. 4 represents steps that are initiated during an initial power-up of a MEMS gyroscope including a start-up sequence followed by ongoing dynamic modification of the drive signal based on monitoring and control by the drive loop.

Figure 5:
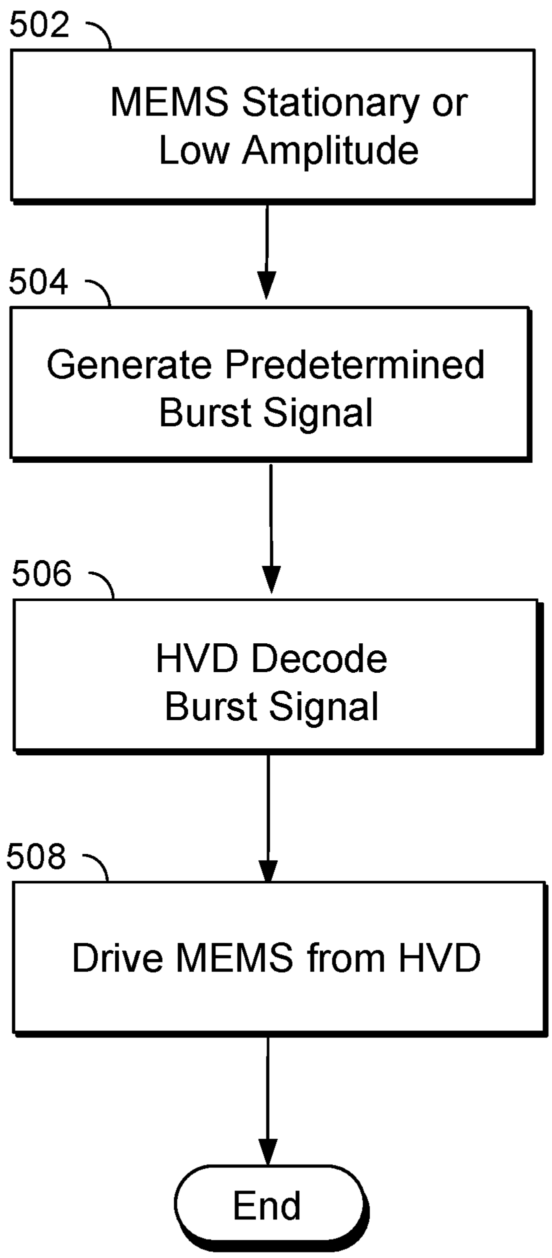
FIG. 5 depicts exemplary steps of an initial burst portion of a start-up phase of operation of a gyroscope drive signal drive loop in accordance with an embodiment of the present disclosure.

At step 402, an initial burst drive signal is provided to initiate movement of the drive system of the suspended spring-mass system of the MEMS gyroscope, as is depicted and described in more detail in FIG. 5. For example, a digital burst sequence may be provided to the HVD via an HVD decoder (e.g., connected to the digital burst output via a multiplexer) with a particular duty cycle at the resonance frequency for the MEMS gyroscope. This initial burst signal may continue such as for a predetermined time to overcome the initial inertia of the components of the suspended spring-mass system. Once the burst drive sequence has been applied, processing may continue to step 404.

At step 404, the sense and drive path of the analog and digital processing circuitry may be modified to enable a start-up drive path to provide monitoring and control of the HVD drive and corresponding drive sense output. In the analog domain, circuitry such as a multiplexer may connect a drive sense signal (e.g., an output from a DC2V amplifier connected to drive sense electrodes) to the ADC such that the digital start-up processing is based directly off the drive sense signal. The digital startup drive path may also be connected (e.g., by a multiplexer) between the digital start-up processing and the HVD decoder, to facilitate the start-up drive to control the HVD. Processing may then continue to step 406.

Figure 6:
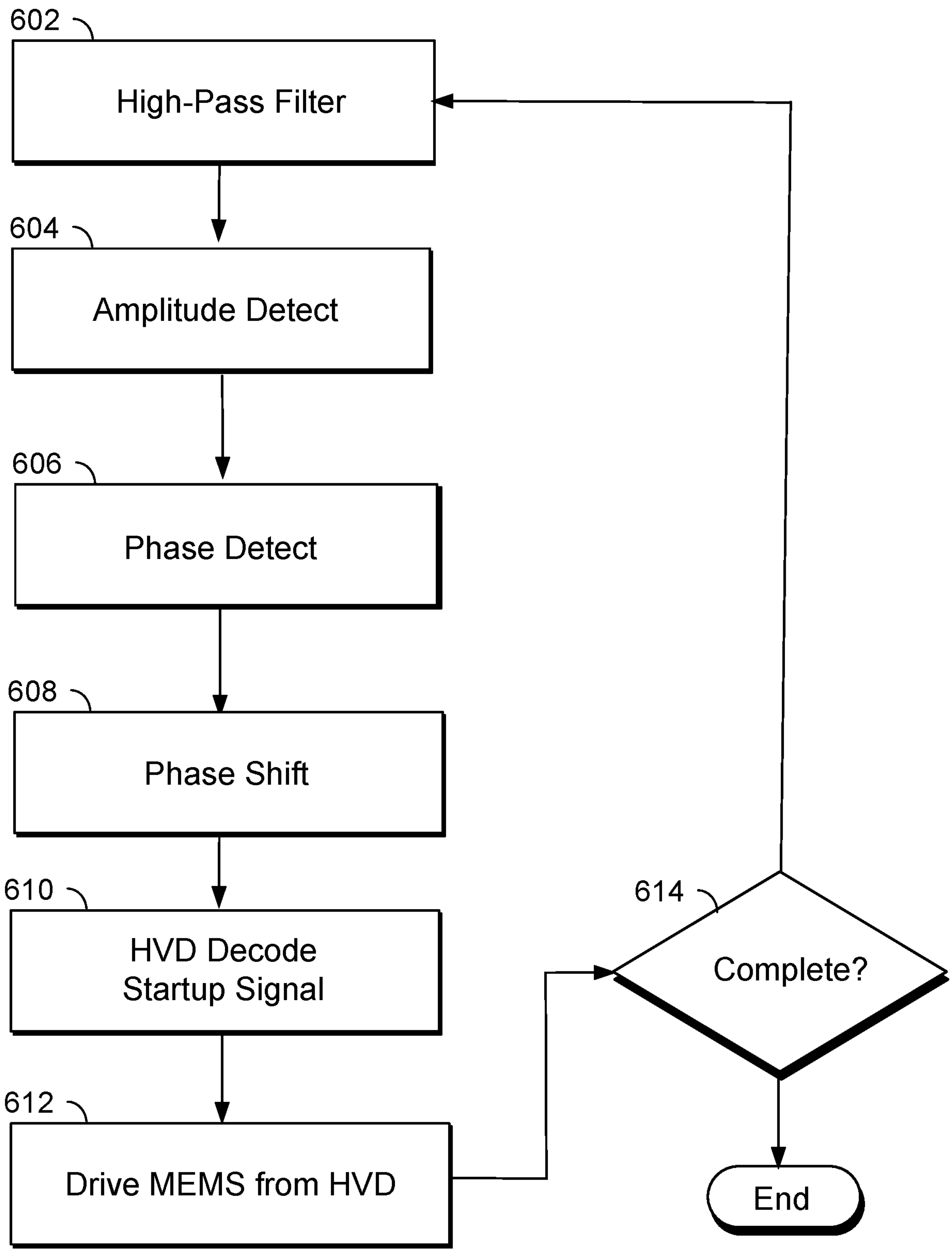
FIG. 6 depicts exemplary steps of a start-up portion of a start-up phase of operation of a gyroscope drive signal drive loop in accordance with an embodiment of the present disclosure.

At step 406, the start-up drive sequence with drive delay may be applied to the MEMS gyroscope, as is depicted and described in more FIG. 6. The characteristics of the digitized drive sense signal may be monitored, for example, for phase and amplitude. The start-up drive provides a drive signal (e.g., having a fixed duty cycle and drive delay) to the HVD via the HVD decoder. Once a start-up criteria is met (e.g., the measured drive sense amplitude exceeding a threshold associated with a comparator used in drive loop timing for a period of time), the processing may continue to step 408.

At step 408, after the start-up phase is complete, the drive error processing path may be connected to the ADC. Within the analog domain the drive sense signal is processed and modified to isolate an error between the drive sense output and a desired drive amplitude for the MEMS gyroscope. Circuitry such as a multiplexer may connect this drive error processing signal path to the ADC, such that a digitized version of the drive error signal may be utilized to control the drive signal. In addition, a digital drive loop control may be connected to control the HVD, such as by a multiplexer that connects the digital drive loop control to the HVD controller. Once the drive error path has been connected, processing may continue to step 410.

Figure 7:
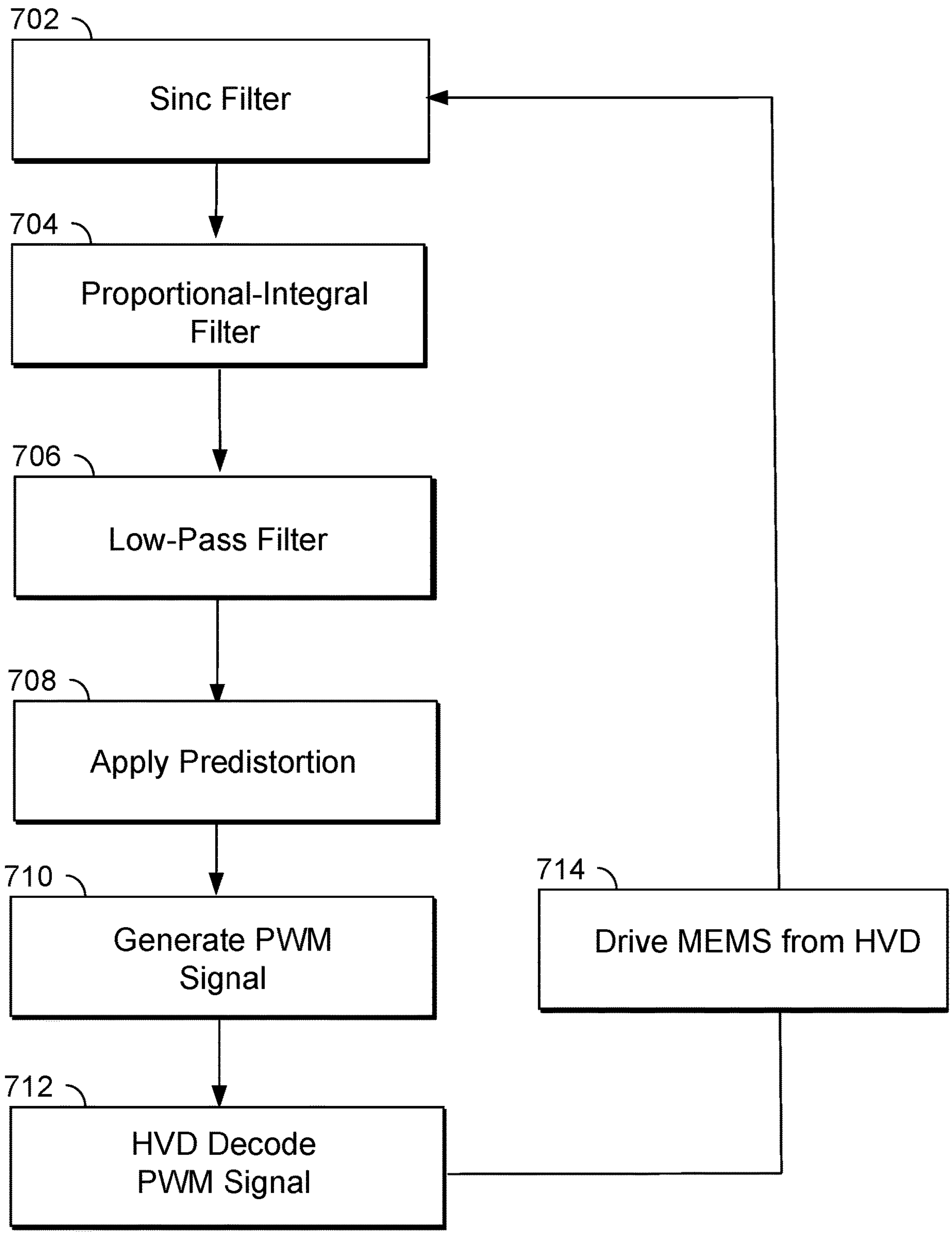
FIG. 7 depicts exemplary steps of an operational phase of operation of a gyroscope drive signal drive loop in accordance with an embodiment of the present disclosure.

At step 410, the operational drive loop control is performed to maintain the drive signal at a desired amplitude, as is depicted and described in more detail in FIG. 7. Analog circuitry processes the received drive sense signal to generate an error signal based on a difference between the drive sense signal and a reference signal. The digitized version of the error signal is then filtered and processed to provide PWM control of the HVD, with the duty cycle of the output signal utilized to modify the amplitude of the drive signal applied to drive the drive masses (e.g., via drive electrodes) of the suspended spring-mass system. Once the PWM drive control has been applied to generate an appropriate drive signal, processing may continue to step 412.

In some implementations, certain components such as the ADC may be shared between the drive loop and the sense path that measures angular velocity. Sense electrodes located adjacent to a proof mass sense movements due to a Coriolis force (i.e., perpendicular to the drive motion) to generate a sense signal that is processed by a C2V amplifier and additional processing circuitry (e.g., filters, integrator, etc.). This Coriolis sense signal may be periodically connected to the ADC to generate a digital signal that undergoes additional digital processing to measure angular velocity, providing significant area savings over separate ADCs. Accordingly, at step 412, the Coriolis sense path may be connected to the ADC after which processing may continue to step 414 to determine angular velocity. After angular velocity has been determined, the operational drive and sense loop may continue, with the ADC periodically being switched between the drive error sense and Coriolis sense paths.

FIG. 5 depicts exemplary steps of an initial burst portion of a start-up phase of operation of a gyroscope drive signal drive loop in accordance with an embodiment of the present disclosure. At step 502, the suspended spring-mass system of the MEMS gyroscope is initially at rest or operating at a low amplitude. Drive masses that are located adjacent to drive electrodes, and components such as proof masses that are caused to oscillate via connections to the drive masses, must overcome an initial inertia to begin oscillating at a frequency and amplitude suitable for processing. In order to initiate the oscillation, processing continues to step 504.

At step 504, a digital burst control generates an initial burst signal, for example, having a predetermined duty cycle and frequency (e.g., corresponding to the resonance frequency for the MEMS gyroscope). At this initial stage, the burst signal is output in an open loop, such as for a predetermined period of time, without feedback from the drive sense electrodes. Once the digital burst signal is generated, processing may continue to step 506.

At step 506, an HVD decoder receives the digital burst signal and converts the signal to a PWM drive signal that is provided to drive the HVD. In an embodiment, the HVD decoder generates differential pulse-width modulated signals that are provided as digital inputs to the HVD. Processing may then continue to step 508, at which the HVD generates the drive signal (e.g., a PWM drive signal) at an amplitude based on the duty cycle of the signals provided by the HVD decoder and at the frequency (e.g., resonance frequency) of these signals. The drive signal is provided to drive electrodes which in turn initiate the movement of the components of the spring mass system while the burst signal is being applied. Once the time period for applying the burst signal has ended, the processing of FIG. 5 may end.

FIG. 6 depicts exemplary steps of a start-up portion of a start-up phase of operation of a gyroscope drive signal drive loop in accordance with an embodiment of the present disclosure. As described herein, after an initial open-loop burst signal initiates the drive movement of the suspended spring-mass system of the MEMS gyroscope a closed-loop startup phase may be performed to achieve desired drive signal characteristics prior to beginning normal operation of the MEMS gyroscope. Accordingly, a digitized version of the drive sense signal is received for digital processing.

At step 602, the digitized drive sense signal is high-pass filtered. Because the drive sense signal has not been demodulated prior to processing by the digital start-up control, the relevant signal will be at drive frequency.

High-pass filtering retains the relevant drive sense signal while at least partially removing lower frequency offset and noise, such as from the multiplexer and/or ADC. Once the high-pass filtering is complete, processing may continue to step 604.

At step 604, the filtered digital drive sense signal may be monitored for signal amplitude, while at step 606, the filtered digital drive sense signal may be monitored for signal phase and frequency. These values are used to determine whether the MEMS gyroscope drive has achieved suitable characteristics to begin normal (e.g., with DC2V amplitude value near to expected target) operation, as determined at step 614. Once the amplitude and phase have been monitored, processing may continue to step 608.

At step 608, a phase shift is applied to the filtered digital drive sense signal to continue the driving of the drive system of the MEMS gyroscope. For example, a phase shift may account for signal propagation and other sub-block delays, such that the actual drive control remains synchronized with the drive sense with a 90 degree phase shift to optimize the drive efficiency. The resulting phase-shifted signal (e.g., having a predetermined duty cycle such as 50%) may then be provided to the HVD decoder (e.g., via a multiplexer), and processing may continue to step 610.

At step 610, an HVD decoder receives the phase-shifted startup drive signal and converts the signal to a PWM drive signal that is provided to drive the HVD. In an embodiment, the HVD decoder generates differential pulse-width modulated signals that are provided as digital inputs to the HVD. Processing may then continue to step 612, at which the HVD generates the drive signal (e.g., a PWM drive signal) at an amplitude based on the duty cycle of the signals provided by the HVD decoder and at the frequency (e.g., resonance frequency) of these signals. The drive signal is provided to drive electrodes which in turn cause the movement of the components of the spring mass system. Processing may then continue to step 614.

At step 614, it may be determined whether the start-up drive loop is complete. For example, one criteria may be whether the amplitude has exceeded a value associated with consistent processing of the drive sense signal by a comparator of timing circuitry for a predetermined period of time. Another criteria may be whether the phase and frequency of the received drive sense signal are consistent. If the criteria are not met, processing may return to step 602 for additional start-up drive processing. If the criteria are met, the digital start-up control may end.

FIG. 7 depicts exemplary steps of an operational phase of operation of a gyroscope drive signal drive loop in accordance with an embodiment of the present disclosure. As described herein, ongoing drive loop control is initiated after an initial open-loop burst signal initiates the drive movement of the suspended spring-mass system of the MEMS gyroscope and after a closed-loop startup phase is completed. As part of the operating drive loop, analog processing circuitry generates an error signal that is digitized and provided to the digital drive loop control for processing. The digital processing of the operating mode begins at step 702.

At step 702, a sinc function is applied to the digitized drive error signal to remove any offset contribution from the drive error signal that may have been added by analog error signal processing components such as an integrator and/or ADC. Processing may then continue to steps 704 and 706, at which a proportional-integral filter and low-pass filter reduce noise that are added to the drive error signal by the by the integrator and/or ADC. The proportional-integral filter also attempts to minimize the digital representation of the integration output, which in turn corresponds to driving the rectified and demodulated drive sense output to match the reference signal. Processing may then continue to step 708.

At step 708, predistortion control is included to counteract non-linearities that are added by the pulse width modulator. Predistortion control linearizes the overall transfer function of the digital drive loop control to improve the stability of the drive loop. Once the predistortion is applied to the filtered digital drive error signal, processing may continue to step 710.

At step 710, a pulse width modulator generates a digital pulse width modulation control signal to modify the drive signal in a manner to reduce the drive error, for example, by decreasing a duty cycle of a PWM drive when the drive sense amplitude is greater than a reference signal and increasing a duty cycle of a PWM drive when the drive sense amplitude is less than a reference signal. Processing may then continue to step 712.

At step 712, an HVD decoder receives the PWM control signal and converts the signal to a PWM drive signal that is provided to drive the HVD. In an embodiment, the HVD decoder generates differential pulse-width modulated signals that are provided as digital inputs to the HVD. Processing may then continue to step 714, at which the HVD generates the drive signal (e.g., a PWM signal) at an amplitude based on the duty cycle of the signals provided by the HVD decoder and at the frequency (e.g., resonance frequency) of these signals. The drive signal is provided to drive electrodes which in turn cause the movement of the components of the spring mass system. Processing then returns to step 702 to continue the drive loop.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) gyroscope, comprising:

a suspended spring-mass system comprising a driven mass;

a drive system operably coupled to the driven mass via the suspended spring-mass system to impart a drive motion onto the driven mass based on a drive signal;

one or more drive sense electrodes located proximate to the driven mass to generate a drive sense signal based on the drive motion of the driven mass; and processing circuitry configured to receive the drive sense signal, rectify the drive sense signal, subtract the rectified drive sense signal from a drive reference signal to generate an analog error signal, digitize the analog error signal to generate a digitized error signal, digitally filter the digitized error signal with a digital filter, generate a pulse-width-modulated drive control signal based on the digitally filtered digitized error signal, and generate the drive signal in proportion to the pulse-width-modulated drive control signal, wherein the digital filter is configured to linearize a transfer function of a pulse width modulator that generates the pulse-width-modulated drive control signal by applying a pre-distortion function to an output of the digital filter.

2. The MEMS gyroscope of claim 1, wherein the output of the digital filter corresponds to a minimiz ation of the analog error signal.

3. The MEMS gyroscope of claim 2, wherein the digital filter is configured to apply a proportional-integral control function to the digitized analog error signal.

4. The MEMS gyroscope of claim 3, wherein the digital filter is configured to apply a sinc function to the digitized analog error signal prior to the application of the proportional-integral control function.

5. The MEMS gyroscope of claim 4, wherein the digital filter is configured to apply a low-pass filter to an output of the proportional-integral control function.

6. The MEMS gyroscope of claim 1, wherein the processing circuitry comprises analog processing circuitry and digital processing circuitry, and wherein the analog processing circuitry comprises:

a subtraction circuit configured to subtract the drive sense signal from the drive reference signal to generate the analog error signal; and a drive circuit configured to generate the drive signal in proportion to the pulse-width-modulated drive control signal.

7. The MEMS gyroscope of claim 6, wherein the subtraction circuit comprises:

a reference signal input configured to remove a portion of a signal based on the drive sense signal that corresponds to the drive reference signal to generate an error signal; and an integrator coupled to the reference signal input to integrate the error signal over a period of the drive signal to generate the analog error signal.

8. The MEMS gyroscope of claim 7, further comprising a demodulator configured to receive the drive signal to generate a demodulated drive signal based on a frequency of the drive signal, wherein the signal based on the drive signal comprises the demodulated drive signal.

9. The MEMS gyroscope of claim 6, wherein the drive circuit comprises a high voltage drive configured to modify an amplitude of the drive signal in proportion to the pulse-width-modulated drive control signal.

10. The MEMS gyroscope of claim 6, further comprising:

a comparator configured to receive the drive sense signal and generate a phase control signal; and a phase-locked-loop reference configured to generate a clock control signal based on the phase control signal, wherein a timing of the analog processing circuitry and the digital processing circuitry is based on the clock control signal.

11. The MEMS gyroscope of claim 1, wherein the processing circuitry comprises a drive start circuit, wherein, during an initial start-up of the drive start circuit the drive signal is generated based on a drive start-up signal provided by the drive start circuit instead of the pulse-width-modulated drive control signal.

12. The MEMS gyroscope of claim 11, wherein during a first time period during the initial start-up, the drive signal corresponds to an initial burst signal at a burst amplitude and frequency.

13. The MEMS gyroscope of claim 12, wherein during a second time period during the initial start-up and after the first time period, the drive signal corresponds to a start-up signal that is based on an amplitude or a phase of the drive sense signal.

14. The MEMS gyroscope of claim 11, wherein, after the initial start-up, the processing circuitry performs the subtraction, digitizing, filtering, and generation operations.

15. The MEMS gyroscope of claim 1, wherein the driven mass is a proof mass.

16. The MEMS gyroscope of claim 1, wherein the driven mass is coupled to a proof mass to impart the drive motion on the proof mass.

* * * * *